United States Patent
Maufer et al.

(10) Patent No.: US 7,684,440 B1
(45) Date of Patent: Mar. 23, 2010

(54) METHOD AND APPARATUS FOR MAXIMIZING PEER-TO-PEER FRAME SIZES WITHIN A NETWORK SUPPORTING A PLURALITY OF FRAME SIZES

(75) Inventors: Thomas A. Maufer, Menlo Park, CA (US); Anand Rajagopalan, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1469 days.

(21) Appl. No.: 10/741,633

(22) Filed: Dec. 18, 2003

(51) Int. Cl.
*H04J 3/00* (2006.01)
*G01R 31/08* (2006.01)
*H04L 12/28* (2006.01)
*H04J 3/24* (2006.01)

(52) U.S. Cl. .................... 370/476; 370/231; 370/395.5; 370/474

(58) Field of Classification Search ................ 370/230, 370/230.1, 231, 235, 389, 395.5, 395.52, 370/400, 401, 449, 465, 470–476, 395.53, 370/395.54; 709/220–222, 233, 245, 246, 709/251, 252
See application file for complete search history.

(56) References Cited

U.S. PATENT DOCUMENTS

| | | | |
|---|---|---|---|
| 5,425,023 A * | 6/1995 | Haraguchi et al. ........... | 370/400 |
| 5,959,974 A * | 9/1999 | Badt et al. ................... | 370/233 |
| 6,236,643 B1 * | 5/2001 | Kerstein ...................... | 370/254 |
| 6,400,730 B1 * | 6/2002 | Latif et al. ................... | 370/466 |
| 6,556,574 B1 * | 4/2003 | Pearce et al. ................. | 370/401 |
| 6,930,988 B2 * | 8/2005 | Koodli et al. ................ | 370/331 |
| 6,973,097 B1 * | 12/2005 | Donzis et al. ................ | 370/470 |
| 7,304,959 B1 * | 12/2007 | Swaroop et al. ............. | 370/252 |
| 7,317,692 B2 * | 1/2008 | Jason et al. .................. | 370/252 |
| 2001/0023460 A1 * | 9/2001 | Boucher et al. ............. | 709/250 |
| 2002/0003775 A1 * | 1/2002 | Nakano et al. .............. | 370/218 |
| 2002/0150041 A1 * | 10/2002 | Reinshmidt et al. ......... | 370/216 |
| 2002/0156612 A1 * | 10/2002 | Schulter et al. .............. | 703/23 |
| 2003/0126294 A1 * | 7/2003 | Thorsteinson et al. ....... | 709/247 |
| 2003/0165160 A1 * | 9/2003 | Minami et al. .............. | 370/466 |
| 2003/0188015 A1 * | 10/2003 | Lee et al. ..................... | 709/238 |
| 2004/0228339 A1 * | 11/2004 | Gallo et al. .................. | 370/379 |

OTHER PUBLICATIONS

Knowles S., RFC 1435-IESG Advice from Experience with Path MTU Discovery, http://www.faqs.org/rfcs/rfc1435.html, Mar. 1993.
Lahey K., RFC 2923-TCP Problems with Path MTU Discovery, http://www.faqs.org/rfcs/rfc2923.html, Sep. 2000.
McCann et al., RFC 1981—Path MTU Discovery for IP version 6, http://www.faqs.org/rfcs/rfc1981.html, Aug. 1996.
Mogul et al., RFC 1191—Path MTU discovery, http://www.faqs.org/rfcs/rfc1191.html1, Nov. 1990.
Plummer D.C., RFC 826—Ethernet Address Resolution Protocol: Or converting network protocol addresses to 48.bit Ethernet address for transmission on Ethernet hardware, http://www.faqs.org/rfcs/rfc826.html, Nov. 1982.

* cited by examiner

*Primary Examiner*—Aung S Moe
*Assistant Examiner*—Redentor M Pasia
(74) *Attorney, Agent, or Firm*—Cooley Godward Kronish LLP (57) ABSTRACT

The present invention provides a method and an apparatus to facilitate the use of larger-than-Ethernet-standard frames having different sizes in a network, such as an extended local area network, where the network can include at least one network element that cannot transfer data as larger-than-Ethernet-standard frames. In one embodiment, a method for formatting data for transportation over a network comprises identifying a network element capable of using data formatted as a non-standard frame, such as a jumbo frame. Then, the method provides for determining a non-standard frame size that is useable by the network element. More generally, the technique is applicable to any LAN infrastructure comprised of devices supporting a variety of frame sizes, so that any device may discover the largest frame size that is supported to any other device within the same network.

6 Claims, 5 Drawing Sheets

Table of Adjusted Frame Sizes
for Peer MTU Probe, PMP[x]

| PMP[00]: | 1522 | (802.3 MTU) | PMP[08]: | 9022 | 6*1500+22) |
| --- | --- | --- | --- | --- | --- |
| PMP[01]: | 2346 | (802.11 MTU) | PMP[09]: | 9180 | (AAL5 MTU) |
| PMP[02]: | 4500 | (FDDI MTU) | PMP[10]: | 9234 | (9*1024+18) |
| PMP[03]: | 4518 | (3*1500+18) | PMP[11]: | 9238 | (9*1024+22) |
| PMP[04]: | 4522 | (3*1500+22) | PMP[12]: | 10240 | (10*1024) |
| PMP[05]: | 6018 | (4*1500+18) | PMP[13]: | 16406 | (16*1024+22) |
| PMP[06]: | 6022 | (4*1500+22) | PMP[14]: | 16518 | (11*1500+18) |
| PMP[07]: | 9018 | (6*1500+18) | PMP[15]: | 16522 | (11*1500+22) |

METHOD AND APPARATUS FOR MAXIMIZING PEER-TO-PEER FRAME SIZES WITHIN A NETWORK SUPPORTING A PLURALITY OF FRAME SIZES

FIELD OF THE INVENTION

The present invention generally relates to data transfer in a communications network. More particularly, the present invention is directed towards determining whether an end station can transfer data at a particular frame size over a network, where the network may include other end stations that cannot transfer data at that desired frame size.

BACKGROUND OF THE INVENTION

The frame sizes used by networked computing devices to transmit and/or receive data are network-dependent, and in some cases they increasing over time. For an example of increasing size, the latest Ethernet network interface cards ("NIC"), which are operable at one or more gigabits per second ("Gbps"), now include physical ("PHY") and media access control ("MAC") components that can also communicate data at frame sizes larger than the traditional (standardized) maximum frame size (i.e., 1522 bytes). One such larger frame size is the jumbo frame size of 9,022 bytes, which is typically used in gigabit Ethernet networks.

But standards that govern these larger frame sizes do not currently exist. For example, the size of an Ethernet jumbo frame is not standardized. According to the Institute of Electrical and Electronics Engineers ("IEEE") standard IEEE 802.3-2002, frame sizes larger than 1522 bytes are not allowed. Further, there generally is no other accepted industry standard for harmonizing Ethernet jumbo frame sizes. As such, various vendors tend to manufacture network devices with differing jumbo frame size capabilities, such as 4,470 bytes, 9,018 bytes, 16,406 bytes, etc.

The lack of an Ethernet jumbo frame standard has slowed adoption of jumbo frames for use in Ethernet networks. Network administrators have long resisted mixing network elements that support varying frame sizes in the same network, such as within a single local area network ("LAN"). In practice, legacy switches and repeaters tend to interpret any frame size over 1522 bytes as an illegal condition, thus curtailing the propagation of such frames. Consequently, many vendors and users recommend upgrading all of the network elements of a given subnetwork or a network to support jumbo frames, if jumbo frames are to be deployed within an Ethernet network. This ensures that these frames can be used safely, without causing such error conditions. As massive upgrades in network elements are costly, replacement of network devices is generally done incrementally rather than at one time. Even if some legacy Ethernet devices are replaced with jumbo-capable network elements, the remaining legacy network elements in the network limit the maximum data transmission format in the portion of the network to which they provide connectivity. Consequently, network managers routinely disable the jumbo frame capabilities of jumbo-capable network elements when introduced into an existing network. Then, the frame sizes of these devices are set to match those of the legacy equipment. These actions typically lead to negligible or nonexistent use of jumbo frame traffic over networks. Ethernets are also frequently connected to other network types, which may have different maximum frame sizes, via layer-2 bridges (also known as switches). Two examples of such situations are wireless IEEE 802.11 Access Points (the IEEE 802.11 standard supports frames up to 2346 bytes in length), and FDDI-to-Ethernet switches (since FDDI supported frames up to 4500 bytes in length). The addition of jumbo frame capability to certain Ethernet devices has introduced variability of the maximum supported frame size even in pure Ethernet environments. Due to the existence of multi-LAN bridges, and of Ethernet jumbo frames, there was a need for an MTU discovery technique, such as is described by this invention.

Thus, there is a need for a method and/or an apparatus to facilitate the use of frame sizes that are larger than those commonly used over a network, especially where the network may include some network elements capable of supporting mixed frame sizes.

SUMMARY OF THE INVENTION

The present invention provides a method and an apparatus to facilitate the use of non-standard frame sizes in a network, such as an extended local area network, where the network generally includes at least one network element is limited to a smaller frame size. Ethernet is the most common type of LAN, and its standard maximum frame size is smaller than that of other popular LAN technologies, so Ethernet's standard MTU (1522 bytes) provides the most practical point of comparison when a station is trying to decide if it is capable of sending a frame larger than might be supported by a given target station. If a station believes it is capable of sending larger frames than might be commonly supported, it would be prudent for it to attempt to discover the capabilities of the target station before attempting to send frames larger than what it knows to be safely transmittable. In one embodiment, a method for formatting data for transportation over a network comprises identifying a network element that can accept a frame size of greater than 1522 bytes. Then, the method provides for determining one or more non-standard frame sizes that are useable by the network element.

In another embodiment, a network element is capable of transmitting a larger-than-1522-byte frame over a network, where the network includes other network elements that are unable to process frames of that size. The network element comprises a protocol stack configured to receive a request to access a target network element coupled to the network. The protocol stack is also configured to generate a peer maximum transmission unit ("MTU") probe. The PMP can determine whether the target network element might use a larger-than-1522-byte frame size. If it does, the protocol stack is configured further to determine the largest viable frame size at which to transfer data between the sending network element and the target network element.

BRIEF DESCRIPTION OF THE FIGURES

The invention is more fully appreciated in connection with the following detailed description taken in conjunction with the accompanying drawings, in which.

DETAILED DESCRIPTION OF THE INVENTION

Figure 1:
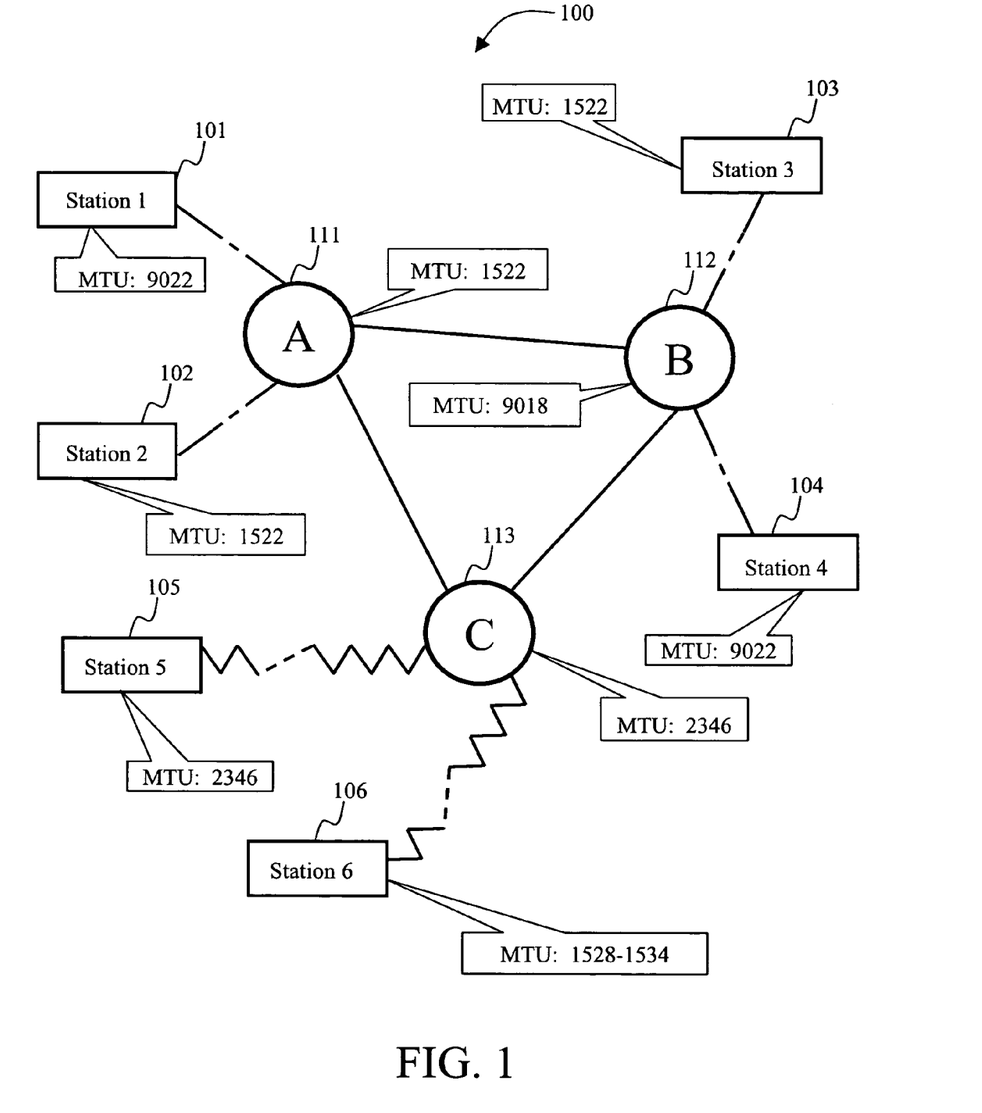
FIG. 1 is a diagram illustrating a portion of a network in which an exemplary method and/or apparatus can be implemented, according to an embodiment of the present invention.

Some aspects of the present invention may be understood with regards to the exemplary network 100 illustrated in FIG. 1. Network 100 includes end stations, such as end stations 101-104 (e.g., Station 1, Station 2, Station 3 and Station 4, which may be connected to network 100 by a wired link) and 105-106 (i.e., Station 5 and Station 6, which may be connected to network 100 by a wireless link). An "end station" may be a computing workstation, personal computer, thin client, personal digital assistance ("PDA"), or any other computing device that is coupled to the network. An end station can be coupled to the network by any known physical medium (e.g., cable), electro-magnetic medium (e.g., radio waves), or other known media. Thus, in one embodiment, Stations 1, 2, 3, and 4 are wired end stations whereas Stations 5 and 6 may be wireless end stations.

Intermediate devices (e.g., intermediate devices ("A") 111, ("B") 112 and ("C") 113), such as switches, bridges, and routers, may be included in network 100 to propagate data from one end station to another end station. Thus a link between two stations, such as Station 1, and Station 4, may include one or more intermediate devices.

In one embodiment, network 100 is an "extended local area network" (an "extended LAN"). An extended LAN is a collection of interconnected LANs (e.g., interconnected by LAN bridges) that are logically equivalent to a single contiguous network. Across an extended LAN, the types of individual LAN technologies may vary greatly, and the maximum transmission unit (MTU) from LAN to LAN may differ. The MTU corresponds to a frame size such that the terms "frame size" and "MTU" can be used interchangeably and can both be defined as the number of bytes of data that constitute an entire frame, which can include header information, payload, and the like.

Individual stations, such as Stations 1, 2, 3, 4, 5, and 6 in network 100 each support sending and receiving standard-sized Ethernet frames (i.e., up to 1522 bytes long) for communicating with other stations in different portions of the extended LAN. However, some or all of the Stations and LAN switches may be capable of also supporting a larger maximum frame size depending on their local capabilities. As illustrative examples, a 1518- or 1522-byte frame may correspond to a standard Ethernet frame size, whereas larger MTUs (e.g., 2346 bytes or 9022 bytes correspond to a larger, non-standard frame size, the former being the IEEE 802.11 MTU, and the latter being a common "jumbo" Ethernet frame size). In the example of FIG. 1, Stations 1 and 4 may support an MTU of 9022 bytes, Stations 2 and 3 may support an MTU of 1522 bytes, Station 5 may support an MTU of 2346 bytes, and Station 6 may support an MTU of 1528-1534 bytes. Additionally, each intermediate device has a maximum MTU. As illustrative examples, intermediate device A may have an MTU of 1522 bytes, intermediate device B may have an MTU of 9018 bytes, and intermediate device C may have an MTU of 2346 bytes.

An end station is said to be "reachable" by another end station if connectivity exists to communicate data packets as frames either unidirectionally or bidirectionally along a link between stations. The size of frames that can be transmitted through the network from one end station to another end station is limited to the largest common supported MTU of all network elements along the link that the frames traverse. Thus the maximum peer MTU is limited to the minimum of the sending station's largest supported frame size, the largest supported frame sizes of the set of intermediate devices along the link to the target station, and the largest supported frame size of the target station.

In embodiments of the present invention, an individual sending station discovers the maximum peer MTU, which is the maximum frame size that can be sent from a sending station along a link to a particular target station. In some embodiments, this includes determining what frame size the sending station supports, determining reachability of a target station, determining if a reachable target station supports non-standard frame sizes, and determining the maximum frame size that can be sent by the sending station and received by the target station.

Figure 2:
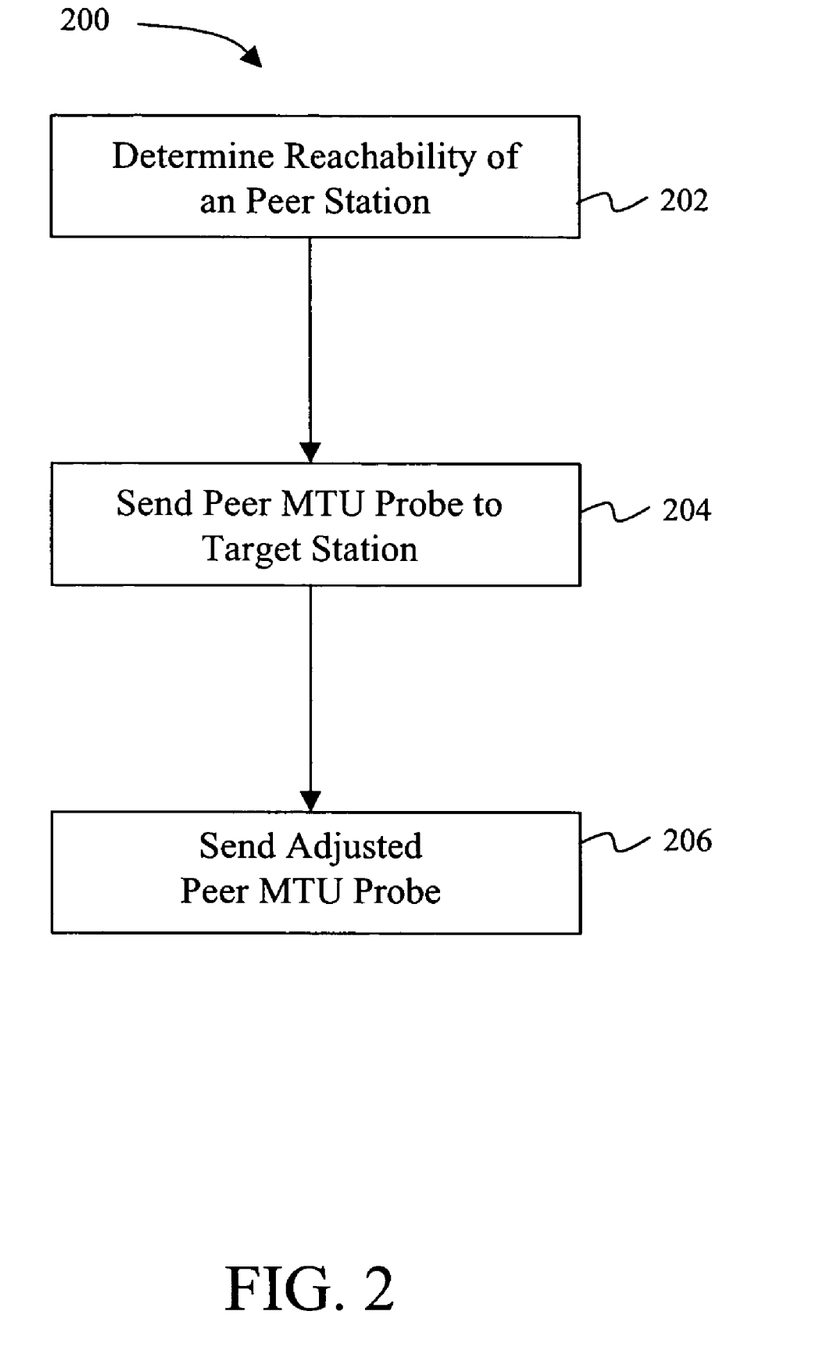
FIG. 2 is a flow chart depicting an exemplary method, according to a specific embodiment of the present invention.

FIG. 2 is a flow chart depicting an exemplary method implemented in an end station, according to a specific embodiment of the present invention. For simplicity, an end station operating in conformance with the method shown in FIG. 2 is designated as the "sending station" and the other end station that is to be queried as to its MTU size capabilities is designated as the "target station." At 202, the sending station first determines whether another end station, such as the target station, is reachable.

To determine reachability, the sending station transmits at least one "reachability discovery probe" (RDP) to the target station. An exemplary RDP is configured to generate a reply when the target station accepts the RDP. Received notice of this acceptance infers reachability. If the first RDP to that target peer does not generate a timely response, then the sending station will make another attempt by re-transmitting the RDP. If multiple attempted RDPs fail, then the sending station infers that the target station is declared to be temporarily unreachable and the MTU size discovery process can be aborted. But if at least one RDP is accepted, a reply is generated and transmitted to the sending station. Upon receipt of this reply to the RDP, the sending station can at least establish: (1) that a target station exists, and (2) the intervening network path and its intermediate devices provide connectivity between the sending and the target stations. With this reply, the sending station confirms the reachability of a particular target station.

At 204, another type of probe is sent to the target station to discover the maximum frame size that the target station can accept (this "largest frame size" is also referred to as the peer MTU). This other probe is referred to as a "peer MTU probe" ("PMP"). The PMP is configured to have an adjustable frame size so that it can be modified to discover the largest MTU size from a range of possible MTU sizes. If the first PMP (using the largest frame size supported by the sending station) is successful, then this per-peer MTU size, equal to the size of the first PMP, is recorded. In the future, transmissions to the target station may be as large as the successful PMP. Thus, after discovering the largest frame size that can be transmitted to the target station, then that frame size can be used whenever the sending station transfers data to the target station. The largest discovered frame size that is useable by a target station is referred herein as the "peer MTU size," and the discovery process in determining its size can be referred to as the "peer MTU discovery" process.

But if the first PMP is unsuccessful in determining that target station can accept a first non-standard MTU size, then a second PMP is sent at 206 to determine whether that target station can accept a second non-standard MTU size that is adjusted from the first non-standard MTU size. If the second PMP is successful, then the MTU size of the second PMP is used in a similar manner as described above for a successful first PMP. But if the second PMP is not successful in discovering a largest MTU size for the target device, then a third PMP with a further adjusted MTU size is sent to the target station. This discovery process continues in a similar manner until a usable larger-than-1522-byte MTU size is discovered, or until a standard Ethernet MTU size is selected as the default frame size when no non-standard MTU sizes are discovered.

In some cases, the peer MTU discovery process can be considered a unidirectional process, which means that it discovers a peer MTU size in only one direction (i.e., for the transmission of frames). In particular, the peer MTU size discovered for transmitting frames from a sending station to a target station, as discussed above, need not be the same as a peer MTU discovered for transmitting frames from the target station and back to the sending station. Differently sized peer MTUs can occur, for example, if the PMPs traverse different paths (or links) in each of the unidirectional peer MTU discovery processes, and if intermediate devices on those different paths support different maximum frame sizes.

In another embodiment of the present invention, flow 200 can be modified to include a maximum MTU self-discovery subprocess. This subprocess operates to first verify whether the sending station has the faculties to transmit at non-standard frame sizes before initiating 202 of FIG. 2. This subprocess can determine, for example, whether a sending station has the proper hardware (e.g., a MC) and/or software to transmit at non-standard frame sizes. If it cannot, flow 200 will be bypassed. With this maximum MTU self-discovery subprocess, an exemplary method of a specific embodiment can be installed on any end station for modifying the discovery process according to the individual abilities of each end station. This subprocess therefore can adapt the discovery process of the present invention when, for example, a MC is upgraded to handle larger frames.

Figure 3:
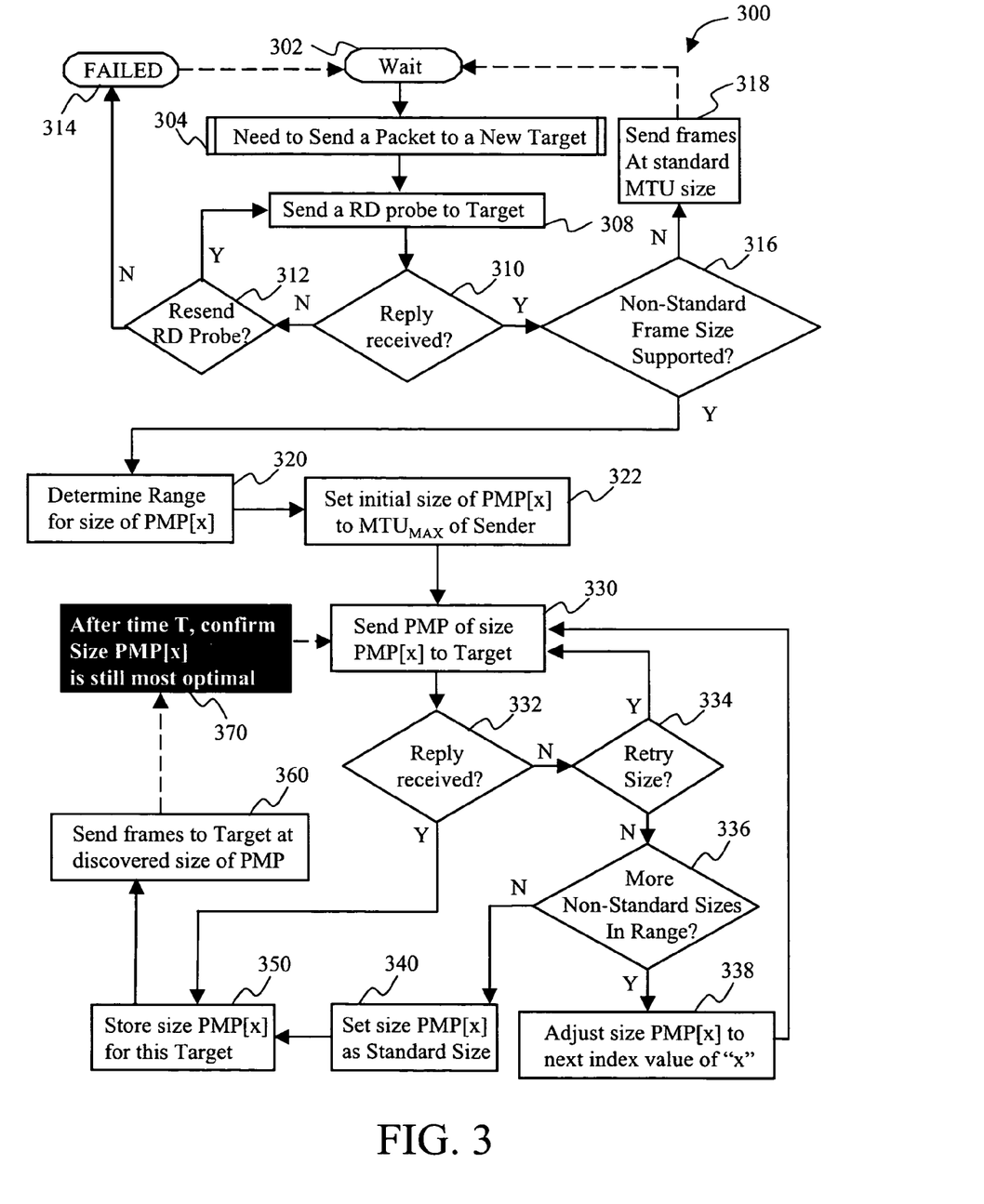
FIG. 3 is a flow chart representative of a specific implementation of an exemplary method, according to an embodiment of the present invention.

FIG. 3 is a flow chart depicting a specific implementation of an exemplary method, according to an embodiment of the present invention. At 302, flow 300 is shown to be in a wait state until a packet is required to be transmitted from, for example, a sending end station to a target end station. At 304, the peer MTU discovery process typically begins when the sending end station needs to send a packet to a target end station. In cases where the sending end station has already determined that the target is reachable, the sending station will use the previously discovered address and peer MTU size for transmissions to the target end station. But if the address of the target is unknown, then flow 300 continues to 308 to initiate an exemplary peer MTU discovery process.

At 308, a reachability discovery ("RD") probe is sent via the network to the target end station, which is designated as the target station for the following discussion of flow 300. An exemplary RDP can be similar in functionality as the RDP described in connection with FIG. 2. Further to this example, an RDP can be configured to have a minimal frame size and can be designed to determine the address (i.e., MAC target station address) of the target station. After the RDP is sent, the sending station will wait for an interval of time to receive a reply from the target station at 310. If no reply is received during that interval, then an identical RDP is re-sent at 312. If a reply is again not received at 310, then the exemplary method retries sending the RDP at 312 until an upper limit is reached. For example, flow 300 may be designed to send up to four total RDPs to determine reachability. If no reply is received for any of the RDPs, then flow 300 indicates to the sending station, for example, that the reachability process has failed at 314. This failure indicates that the target station is unreachable, at least during the time reachability is being determined. Blocks 304 to 312 can be repeated at some later time to reconfirm that the connectivity to the previously non-responding target station remains nonexistent, such as the next occasion that the sending station has a requirement to send data to that target station.

If a reply is received at 310, then flow 300 continues to optionally determine whether the sending end station can itself support non-standard MTU sizes at 316. If the sending station does not, then flow 300 continues to 318. Here, flow 300 will set the peer MTU size for the sending station as the standard MTU size so that data can be transferred to the target station, regardless of whether the target station might be able to accept non-standard MTU sizes. After 318, flow 300 returns the sending station to a wait state at 302 until another packet is determined to be bound for another target end station. But if at 316 the sending station determines that it can transmit frames at non-standard frame sizes, then flow 300 continues to 320.

Figure 4:
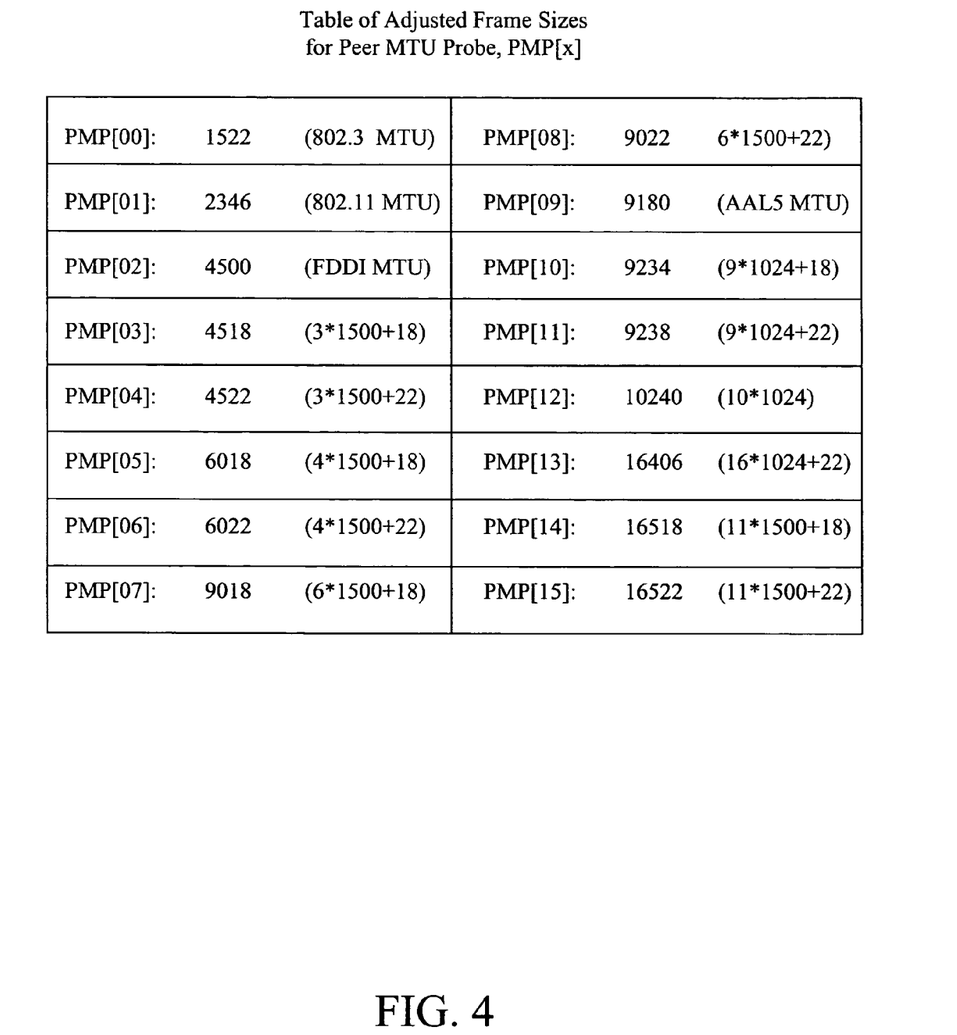
FIG. 4 is a table of exemplary frame sizes in accordance with one embodiment of the present invention.

At 320, a sending station operating in accordance with flow 300 will determine the range of MTU sizes that the sending station can use in the peer MTU discovery process. For example, the range can include all MTU sizes from the lowest MTU size of the range, which is typically the standard MTU size, to the greatest MTU size of that range, which generally is the maximum MTU size at which the sending station can transfer data. A subset of all possible MTU sizes between the lowest supported by the attached network, up to the greatest MTU size supported by the interface being used by the sending station to attach to that network. For example, FIG. 4 is a table illustrating one possible subset of MTU sizes. It should be obvious that a table with more intermediate sizes, or fewer, does not change the essence of this invention. In fact, a table is not required, since the implementation could, as an example, start with the sending station's maximum supported frame size, and search downward until a non-standard frame size succeeds. The decrease could be by subtracting some number of bytes from the PMP on each iteration, or by reducing the PMP's size by a fixed percentage at each iteration, or by any other algorithm that arrives at a close approximation of finding the largest non-standard frame size that may be successfully sent from the sender to any given target.

At 322, a peer MTU probe ("PMP") is configured to have its initial size set to the maximum MTU ("$MTU_{MAX}$") useable by the sender station, as determined at 320. The size of the PMP is designated as PMP[x], where "x" is an index that corresponds to a particular MTU size and has values of 0, 1, 2, ..., n. For example, if the $MTU_{MAX}$ of the sender station is 9018 bytes, then this size corresponds to the index value of 07, as depicted in the table of FIG. 4. As such, the initial size of the PMP in this instance is set to size PMP[x=07], which is 9018 bytes. At 330, the PMP is sent to the target station. In some embodiments, the target can be any network element reachable via the network.

After a PMP is sent to the target station, a reply will be sought. A reply, among other things, indicates the target station's ability and willingness to receive and to use frames up to the size of the PMP that initiated the reply. At 332, a sending station awaits receipt of a reply. If a reply is not received, and while it is permissible to retry, then another PMP is re-sent at 334 with the same size of PMP[x]. But if no reply is received after, for example, one to three PMPs are re-sent with the same size PMP[x] at 334, then the sender station can conclude that size PMP[x] with the particular index value of "x" is an unacceptable frame size with which to send frames to the target station. The number of permissible times that a PMP can be retried at 334 can be any number.

At 336, a determination is made as to whether any non-standard MTU sizes remain unprobed in the range defined at 320. If there are none, then the probe size PMP[x] is set to the standard MTU size and is stored at 350 for the specific target. But if there are one or more non-standard MTU sizes yet to be examined, then the flow continues to 338 where the size of the PMP is adjusted (e.g., another probe is generated with an adjusted size). Note the standard MTU size for this example is associated with the index value of "00," as shown in the table of FIG. 4.

At 338, the size PMP[x] of the PMP is adjusted to another size corresponding to another index value of "x," which may be any other value of x (i.e., the next value of x need not be a sequenced number). Continuing with the previous example, the adjusted probe size in this case is adjusted from PMP [x=07] to PMP[x=06] of the table in FIG. 4, if the next index value of x is "06." Hence, probe size PMP[x=06] corresponds to 6022 bytes, which is re-sent as another PMP at 330. If further adjustments are required during the discovery process, these adjustments will be made to the probe size PMP[x] at 338 as flow 300 continues to determine the peer MTU. Further to this example, subsequent values of "x" are selected in an incrementally decreasing fashion. That is, the next adjusted sizes of PMP[x] will correspond to those x values of 05, 04, 03, etc.

Returning to 332, consider the case where a reply is received. Once a reply is received from the target station that accepts a certain probe size of PMP[x], the sending station can at least establish: (1) that the target station is still reachable since the RDP(s) were sent, (2) that the target station can handle MTUs having a size of at least PMP[x], and (3) the intervening network path (i.e., link) can handle MTUs having a size PMP[x]. This information can later be used to transmit data using frame sizes of the discovered peer MTU.

After a receipt of a reply, flow 300 continues to block 350 and stores that size PMP[x] in an association with that target's address. Thereafter, at block 360, the sending station can send data to the target station in frames as large as the discovered peer MTU size, PMP[x]. A sending station operating in accordance with flow 300 can periodically (e.g., after some time, T) confirm that the previously discovered peer MTU size remains the largest useable MTU size at 370. It does so by repeating a part of the peer MTU discovery process from blocks 330 to 350. Lastly, in some embodiments, flow 300 can continue directly from block 350 to block 330 (not shown) to store each of the PMP[x] sizes that are acceptable for use with a particular target. As such, the sending station can determine a set of acceptable MTU sizes first before selecting the particular peer MTU with which to transfer data. A person having ordinary skill in the art should recognize that at least a portion of the peer MTU discovery process, such as from block 320 to 350 can be modified without undue effort to discover any desired peer MTU size in any manner. Such modifications are within the scope and the spirit of the present invention.

In accordance with another embodiment of the present invention, another exemplary method can be implemented in any broadcast-capable LAN technology (e.g., Ethernet, IEEE 802.11, FDDI, etc.). In this instance, an RDP can be configured to be an Address Resolution Protocol ("ARP") Request (i.e., an "ARP Request" frame) having a size of 64 bytes. This size is convenient for sending over any type of LAN as it is an acceptable frame size for all types of LANs. The ARP Request frame as an RDP enables the sending station to specifically identify potential target stations by their MAC and IP addresses (e.g., based on information established by an ARP Reply message received from the target station by the sending station). These addresses can be stored as references for future data transmission. After a target station accepts an RDP configured as an ARP Request, the sending station should receive a reply indicating acceptance of the RDP. Specifically, a target's acceptance is indicated by sending an ARP Reply (e.g., an "ARP reply frame"), which is generated by the target station and then received back by the sending station. As a result, the sending station deems that the target is reachable.

Generally, an ARP Request frame is typically used to acquire a target station's hardware address (e.g., MAC address) and/or targets station's network address (e.g., IPv4 or IPv6 address). The Address Resolution Protocol is described in Request For Comments number 826 ("RFC 826"), entitled "An Ethernet Address Resolution Protocol—or—Converting Network Protocol Addresses to 48-bit Ethernet Address for Transmission on Ethernet Hardware," dated November 1982, which is incorporated herein by reference in its entirety for all purposes. Note that, despite its title, ARP operates on all broadcast-capable LAN media, and is not limited to operation over Ethernet.

Once a candidate end station is identified as a target, then that candidate can be sent a single, directed PMP rather than, for example, a broadcasted set of probes. The method can use the discovered MAC address for the target to direct the transmission of the PMP. By sending directed PMPs, the peer MTU discovery process of one embodiment of the present invention enables the discovery of a peer MTU size to use a relatively small number of discovery probes. This minimizes the amount of unnecessary RDPs and/or PMPs injected into a network, thus minimizing wasting network bandwidth on the reachability and peer MTU discovery processes.

Similar to the RDP, the PMP can also be configured as an ARP frame, augmented with the appropriate amount of padding, resulting in an ARP Request frame of size PMP[x]. As such, the PMP in accordance with a specific embodiment of the present invention is a unfragmentable link-layer probe frame that has an adjustable size. When instantiated as an ARP Request frame, the PMP can be padded (i.e., adjusted) to a frame size of any desired number of bytes less than or equal to the MTU of the sending device. By adjusting the amount of padding of a specific PMP, the size PMP[x] can be achieved. Similar to the RDP, a PMP can be implemented using a specific type of unfragmentable LAN frame. In one possible embodiment, the PMP can be configured as an unfragmentable Ethernet frame having a jumbo frame size, containing an ARP Request packet.

According to other embodiments of the present invention, the process of selecting which probe sizes, PMP[x], to send to a target station can be modified. These modifications in selecting an initial size PMP[x=1], and subsequent PMP sizes, are also within the scope of the present invention. That is, any number of optimization techniques can be employed at 338 of FIG. 3 to adjust the size of various PMPs. One such exemplary technique involves starting at a low-valued PMP size at 322, such as 2,346 bytes, and probing up to the maximum MTU of the sender. Another exemplary technique is similar to that described above in connection with FIGS. 3 and 4 (i.e., starting at $MTU_{MAX}$ for the sender and probing with decreasing sizes), but the second index value of x is set to "01" (i.e., PMP[x] is set to 2,346 bytes, which is one size larger than the standard MTU size). Thereafter the third and higher index values start at 08 and subsequently decrease. This way, a sending station need not probe each of the MTUs in a range of MTUs before concluding that the target station cannot accept non-standard MTU sizes.

In other examples, the first and each subsequent PMP size can be determined by selecting: (1) a fixed number of bytes (e.g., 1 or more bytes) to increment/decrement to the next PMP size, (2) any of the common PMP sizes known in the art (e.g., 10,240, 16,406, etc.), such as from an indexed list (similar to that shown in FIG. 4), (3) random increases/decreases in PMP sizes, (4) any known search or statistical techniques, such as a binary, linear, or the like, (5) probing with increasing/decreasing sizes as observed with past values of frame sizes transmitted by the sender, and the like. One having ordinary skill in the art should appreciate that there are other suitable optimization techniques for discovering the peer MTU in an effective manner, all of which is within the scope and the spirit of the present invention.

One ordinarily skilled in the art should appreciate that other exemplary methods of the present invention can be realized using any variable-sized unfragmentable probe other than an ARP request and/or with other protocols other than IP version 4. For example, an "oversized" (i.e., padded), IP version 6 ("IPv6") frame, such as an Internet Control Message Protocol ("ICMP") frame, can be used as a PMP, similar to an ARP Request, which is used with, in particular, IPv4.

In accordance with IPv6, each network element, including end stations, is responsible for its own fragmentation, and because intermediate devices cannot fragment IPv6 frames, an "oversized" IPv6 frame is a suitable unfragmentable PMP. As another example, the use of the ICMPv6 "ping" protocol is also suitable to practice an exemplary method of the present invention, as IPv6 frames cannot be fragmented by intermediate devices.

According to an embodiment of the present invention two or more exemplary methods can be used concurrently. For example, the neighbor discovery techniques protocol for IPv6 (i.e., a padded IPv6 "ping" frame) and/or oversized IPv6 frames can be used in concurrence with Ethernet frame size discovery techniques, such as using ARP request/reply with IPv4 as described in one or more exemplary methods of various embodiments of the present invention.

In accordance with another embodiment, an APPLETALK ARP request can be modified to determine an optimized PMP size in an APPLETALK environment. Further, the IPv6 neighbor discovery protocol can be modified (i.e., by padding the IPv6 neighbor discovery frames) to a maximum LAN frame size that a sending station can send as determined by its NIC. This leverages the unfragmentable nature of IPv6 frames.

It also in the spirit and the scope of the present invention to use any protocol having a "neighbor discovery-type" function that can be modified according to some of the exemplary methods of the present invention. Further, protocols lacking such a function (e.g., no "ARP-like" function is supported), such as Novell's Internetwork Packet eXchange ("IPX"), can be modified according to the present invention to determine whether a networked end station can use non-standard frame sizes in mixed-frame size environments, such as over an extended LAN.

Figure 5:
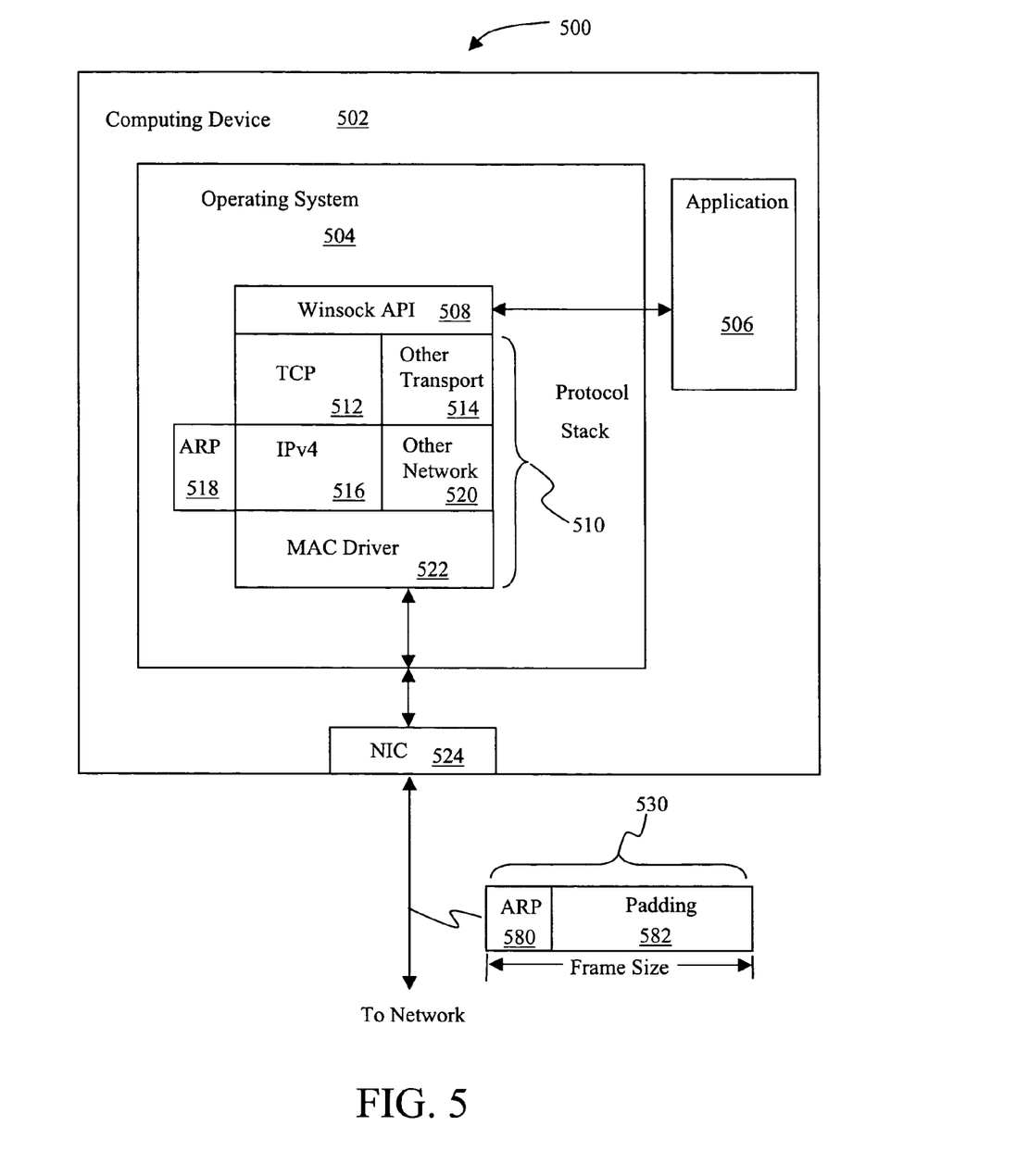
FIG. 5 is a block diagram of a computing device configured as an exemplary network element in accordance with one embodiment of the present invention.

FIG. 5 is a block diagram for a computing device configured as an exemplary apparatus in accordance with one embodiment of the present invention. Computing device 502 in this example is capable of transmitting frames at non-standard MTU sizes with another network element, such as another computing device. In the example shown in FIG. 5, computing device 502 includes an operating system 504 coupled to a MC 524, which can be, for example, an Ethernet network adapter. Operating system 504 also includes a protocol stack 510, which can be any set of network protocols for binding high-level protocol layers, such as an application layer, to lower-level protocol layers, such as a physical layer including MC 524. In some embodiments, more than one MC 524 and more than one MAC driver 522 can be used in accordance with the present invention.

Protocol stack 510 is shown to include at least a transport layer, a network layer and a link layer. The transport layer includes at least one transport protocol, such as a TCP process 512 (i.e., a TCP service) or an optional another type of transport protocol, "other transport" protocol 514, such as "UDP." FIG. 5 shows the network layer, which includes an IP process 516 (i.e., an IPv4 or IPv6 service), can be at a next higher layer over the link layer, which includes an associated ARP process 518. Optionally one or more "other network layer" protocols 520 can also be present. Other protocol layers, although not shown in FIG. 5, can be included in protocol stack 510. According to one embodiment of the present invention, protocol stack 510 is a collection of processes embodied in software. In another embodiment, protocol stack 510 and/or its constituents can be embodied in software or hardware, or both. In accordance with a specific embodiment, an exemplary method of the present invention is implemented in protocol stack 510.

Each process (e.g., TCP 512, IPv4 516, etc.) of protocol stack 510 is configured to communicate with other processes, such as across layers of protocol stack 510. A higher-level layer, such as the transport layer, can be configured to communicate, for example, via a Winsock API 508 with an application 506. Winsock API 508 can be considered as a portion of operating system 504. A lower-level layer, such as either a network layer or a link layer, can be configured to communicate, for example, via a MAC driver 522 with MC 524. In one example, MAC driver 522 includes a memory buffer and MC 524 includes a PHY and a MAC component, both of which can intrinsically limit the frame size of frames 530 exchanged with the network.

According to a specific embodiment of the present invention, an exemplary protocol stack 510 can include one or more exemplary processes to determine an optimum frame size as the largest frame size, for example, for the data transfer format. As an example, consider that application 506, such as a file transfer protocol ("FTP"), seeks to access a remote network element (not shown) reachable via a network, such as an Ethernet network. Application 506 can request that communication be established with that remote network element, which is associated with a unique IP address, by first communicating its intent (e.g., by way of a system call) to send data via an API 508 with protocol stack 510.

Protocol stack 510 thus can perform an exemplary method, according to the present invention, for enabling deployment of the largest possible frames over a network by determining whether a remote, target network element is capable of accepting non-standard MTUs, and if so, the greatest frame size transmittable from the computing device 502 to the target station. It does so by, for example, sending PMPs, such as frame 530, which can be formed by varying the size of an ARP request frame. In this case, frame 530 as an ARP Request frame will include ARP-specific information 580 (e.g., ARP header information, including target station address, packet status as a Request or a Reply, etc.) and variable-length padding 582. The amount of padding 582 can be modified to adjust the size of the ARP request frame, which therefore adjusts the probe size. In one embodiment, protocol stack 510 is configured to modify PMP padding 582.

Once the optimum frame size is determined, then that size can be appended to an entry in an ARP cache (not shown), the entry includes mappings that relate a target station's IP address with the target station's MAC address. Thereafter, computing device 502 can readily configure its frames for optimum data transfer by using the appended size of the ARP cache.

In addition to the other benefits provided by the present invention, a unfragmentable PMP enables a network element to calibrate the transfer of data over network paths by changing the data transfer format, such as the frame size. For example, the calibration includes a number of ARP Request and ARP Reply pairs, with the ARP Request packets being sent using different frame sizes. Thus, it is desirable in some cases to employ multiple PMPs having, for example, varying PMP sizes to determine the optimal frame size (e.g., the largest frame size) to exchange data via one or more network paths (or links) among each of several network elements capable of accepting non-standard frame sizes.

It will be understood that the method of the present invention may be implemented using any protocol (e.g., Internet Protocol version 4, "IPv4"), in any broadcast-capable LAN technology (e.g., an Ethernet network), over any communications media (e.g., Ethernet cabling, wireless, optical fibers, etc.) and for use with any computing device (e.g., a wireless station) as an end station, without deviating from the scope and the spirit of the present invention.

It will be understood that the peer MTU discovery processes can be implemented, in part, as a software module. An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as optical disks; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

What is claimed:

1. A method in a sending end station capable of supporting a larger-than-Ethernet-standard frame size for formatting data for transportation over an extended Local Area Network (LAN) in which it is unknown at some initial time the frame sizes supported by other network elements, said method comprising:

identifying a target network element capable of using data formatted as a non-standard frame, by sending an Address Resolution Protocol (ARP) request frame as a reachability discovery probe (RDP) over said LAN to determine if said target network element is reachable;

determining the larger-than-Ethernet-standard frame size useable by said target network element by sending a sequence of at least one Address Resolution Protocol (ARP) request frame including a variable amount of padding as a peer maximum transmission unit probe (PMP) over said LAN to said target network element, each PMP having a frame size wherein a reply received from the target network element in response to a particular PMP indicates that the target network element is capable of receiving data formatted at the frame size associated with the PMP that triggered the reply;

the sequence of at least one PMP having a sequence of corresponding frame sizes adjusted to another size corresponding to an index value x to discover a largest maximum transmission unit between the sending end station and the target network element.

2. The method of claim 1 further comprising formatting data to be sent to said target network element as a frame having said larger-than-Ethernet-standard frame size.

3. The method of claim 1 wherein the sequence of at least one PMP begins with a first PMP having a largest frame size with each subsequent PMP having a successively smaller frame size than the previous PMP, the size of the frame size of each PMP being reduced in each successive PMP until a final PMP is generated that triggers the reply from the target network element.

4. The method of claim 1 wherein said PMP is an unfragmentable, link-layered frame.

5. The method of claim 1 wherein said PMP is an APPLE-TALK ARP request frame including a variable amount of padding.

6. A method in a sending end station capable of supporting a jumbo Ethernet frame size for formatting data for transportation over an extended local area network (LAN) in which it is unknown at some initial time whether all of the network element support jumbo Ethernet frames, said method comprising:

sending, by the sending end station, an Address Resolution Protocol (ARP) request frame as a reachability discovery probe (RDP) over said LAN to identify a target network element to determine if said target network element is reachable; and determining, by the sending end station, the jumbo Ethernet frame size is useable by said target network element by sending a sequence of at least one an Address Resolution Protocol (ARP) request frame with a variable padding as a peer maximum transmission unit probe (PMP) over said LAN to said target network element, each PMP having a frame size wherein a reply received from the target network element in response to a particular PMP indicates that the target network element is capable of receiving data formatted at the frame size associated with the PMP that triggered the reply;

the sequence of at least one PMP having a sequence of corresponding frame sizes beginning with a largest jumbo frame size supported by the end station with the frame size decremented downwards in each successive PMP to another size corresponding to an index value x until a maximum transmission unit between the sending end station and the target network element is discovered.

* * * * *